2,798,595
MATCHBOOK WITH RECESSED TOOTHPICK

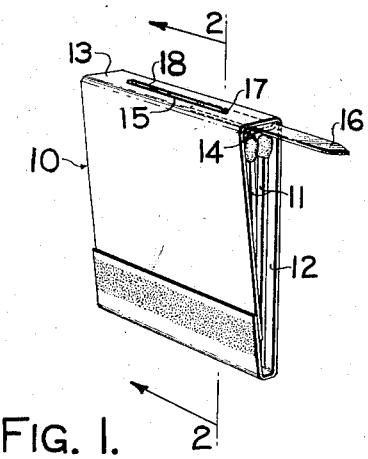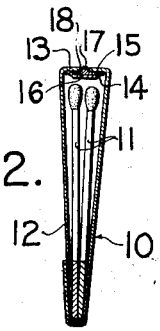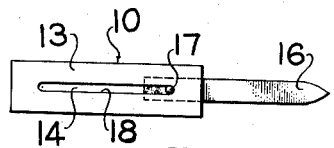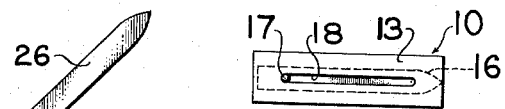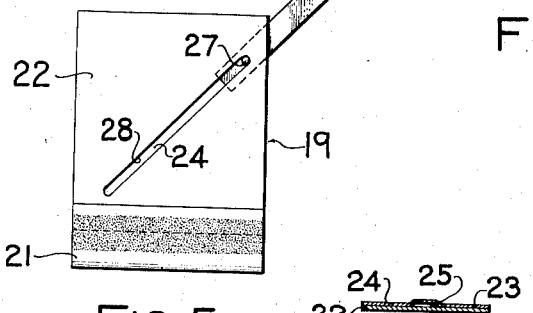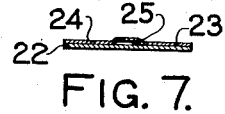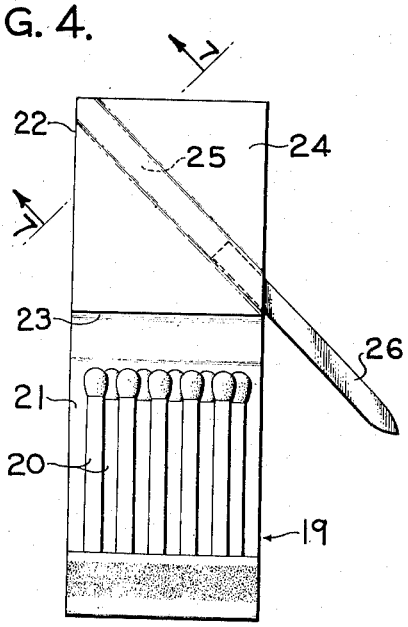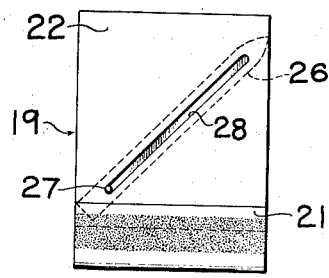

Hyman A. Lieberman, New York, N. Y.

Application April 25, 1956, Serial No. 580,651

3 Claims. (Cl. 206—29)

The subject matter of this invention relates to toothpicks and has for its objective the creation of a matchbook provided with a toothpick recessed within the cover thereof and adapted to be extended out of the cover whenever required for use, and retracted when no longer required.

The toothpick is one of the most common and basic necessities of mankind, since particles of food invariably tend to lodge between the teeth in the course of eating and chewing, and cannot ordinarily be extricated without the use of a toothpick. However, people ordinarily do not carry a supply of loose toothpicks with them for obvious sanitary reasons as well as because of forgetfulness, despite their basic and common necessity, and most restaurants are prohibited from supplying loose tooth picks because of sanitary regulations. Moreover, on many occasions not only food but particles of tobacco, gum and candy become lodged between the user's teeth during the course of a day, that can be dislodged only by a toothpick.

Statistics show, on the other hand, that most people are smokers, and rare is the lady's purse or gentleman's pocket that does not contain at least one matchbook.

One of the principal objects of my invention, therefore, is to provide a matchbook containing a reuseable toothpick concealed within the cover and adapted to be readily extendible therefrom quickly and conveniently for use, and similarly retractable when not required.

Another important object of my invention is the provision of a retractable toothpick secured within a matchbook cover, adapted to last at least as long as the matchbook in use.

A third important object of my invention is the provision of a retractable toothpick which can be maintained clean and free from contamination and dirt.

Still another important object of my invention lies in the provision of a combination matchbook and toothpick holder which can be made easily and at an insignificant cost.

Other important and salient objects, advantages and functional features thereof will be more readily appreciated from an examination of the detailed specification herein, taken with the accompanying drawings, wherein:

Fig. 1 is a perspective view of a preferred embodiment of my invention;

Fig. 2 is a transverse section taken on lines 2—2 of Fig. 1;

Fig. 3 is a top view, showing the toothpick extended from the matchbook;

Fig. 4 is a view similar to Fig. 3, but showing the toothpick retracted within the matchbook;

Fig. 5 is a front elevation of a modified embodment showing the matchbook closed and with the toothpick extended;

Fig. 6 is a front elevation of the modified embodiment with the matchbook open;

Fig. 7 is a transverse sectional view, taken on lines 7—7 of Fig. 6; and

Fig. 8 is a view similar to Fig. 5, with the toothpick recessed within the matchbook.

Similar reference characters designate similar parts throughout the different views.

Referring now to the embodiment shown by Figs. 1–4, the combination matchbook and toothpick holder comprises the common form of paper matchbook 10 provided with rows of matches 11 secured therein enveloped by a paper cover 12 which is provided with a flat top section 13 in which an elongated slot 18 is cut, as shown. A paper flap 14 is adhesively secured around three sides of the inner surface of the top section 13 to define a raised recess 15 thereinbetween with an opening at one end of the top section 13. A sterile, pointed toothpick 16, made of plastic or of a similarly sturdy material and provided with a raised projection 17 is disposed within the recess 15 so that the projection 17 extends from the top section 13 through the slot 18, with the point of the toothpick 16 in the direction of the opening between the top section 13 and the flap 14.

As is apparent, thumb movement of the projection 17 along the slot 18 extends the toothpick 16 for convenient use, while thumb movement of the projection 17 in the opposite direction along the slot 18 retracts the toothpick 16 back into the recess 15.

In the embodiment shown in Figs. 5–8, the combination matchbook and toothpick holder comprises the common form of matchbook 19 provided with its rows of paper matches 20 secured therein, enveloped by a paper cover 21 in which a diagonal slot 28 is cut in the front section 22 of the cover 21. A paper flap 24 is adhesively secured to the inner surface of the front section 22 to define a raised recess 25 thereinbetween, parallel to the direction of the slot 28, as shown in Figs. 6 and 7, open at one end. A sterile, pointed toothpick 26, made of a plastic material or of a similarly sturdy material, and provided with a raised projection 27, is disposed within the recess 25 so that the projection 27 extends out of the front section 22 through the slot 28, with the point of the toothpick 26 adjacent the opening of the recess 25.

Similar to the operation of the embodiment shown by Figs. 1–4, movement of the projection 27 along the slot 28 in one direction extends the toothpick 26 out of the front section 22 for convenient use, while movement of the projection 27 in the opposite direction along the slot 28 retracts the toothpick 26 back into the front section 22.

The use of the matchbooks 10 and 19 to open same, extract and light the matches in no way interferes with the toothpick, and vice versa. Because of the sturdy construction of the toothpicks 16 and 26, they may be used often, and, because of their insignificant cost, they may be discarded along with the matchbooks after the matches have been used up.

The embodiments shown and described herein, however, are by way of illustration only, and various changes may be made in the construction, combination and arrangement of parts without limitation upon or departure from the spirit and scope of the invention, or sacrificing any of the advantages thereof inherent therein.

Having described my invention, I claim:

1. In combination with a matchbook of the type described, a flap secured to the inner surface of the matchbook cover, the flap being centrally spaced apart from the inner surface of the matchbook cover to define a substantially rectangular recess thereinbetween provided open at one end, an elongated slot in the matchbook cover above and parallel to the recess, a toothpick, a raised projection on the toothpick, the toothpick disposed within the recess adjacent the slot with its projection in registry with and extending above the slot.

2. In combination with a matchbook of the type described, having a cover formed from a strip of cardboard material folded transversely to form a back section, a front section, a substantially rectangular top section and a flap section adapted, with the lower end of the back section, to secure a plurality of cardboard matches, a flap secured to the inner surface of the top section to define a substantially rectangular recess thereinbetween provided open at one of the smaller edges, an elongated slot in the top section above and parallel to the recess, a toothpick, a raised projection on the toothpick, the toothpick disposed within the recess adjacent the slot, with its projection in registry with and extending above the slot.

3. In combination with a matchbook of the type described, having a cover formed from a strip of cardboard material folded transversely to form a back section, a front section, a top section and a flap section adapted, with the lower end of the back section, to secure a plurality of cardboard matches thereinbetween, a flap secured to the inner surface of the front section and centrally spaced apart therefrom to define a substantially rectangular recess thereinbetween diagonal to the plane of the front section and provided open at one edge thereof, an elongated slot in the front section above and parallel to the plane of the recess, a toothpick, a raised projection on the toothpick, the toothpick disposed within the recess adjacent the slot, with its projection in registry with and extending above the slot.

References Cited in the file of this patent

UNITED STATES PATENTS

| | | |
|---|---|---|
| 2,090,712 | Wachholz | Aug. 24, 1937 |
| 2,269,196 | Fried | Jan. 6, 1942 |